Figure 1:
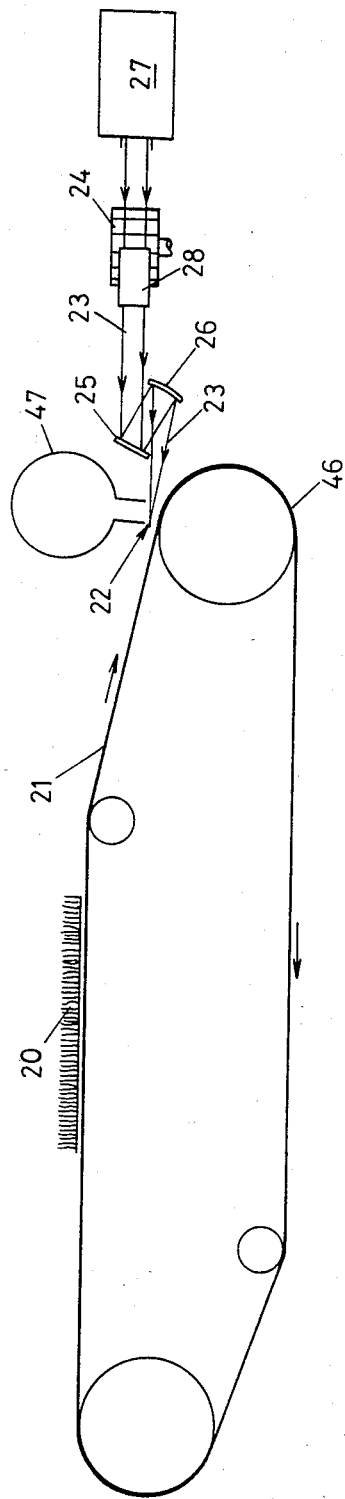

United States Patent [19]

Clegg

[11] Patent Number: 4,578,558
[45] Date of Patent: Mar. 25, 1986

[54] LASER MEANS AND METHOD

[76] Inventor: John E. Clegg, 26 Sheoak Rd., Crafers, South Australia, Australia

[21] Appl. No.: 573,068

[22] Filed: Jan. 23, 1984

[51] Int. Cl.$^4$ ............................................. B23K 27/00
[52] U.S. Cl. ............................... 219/121 LG; 69/24; 219/121 LN; 219/121 LW; 219/121 LX
[58] Field of Search ............... 219/121 LG, 121 LN; 128/303.1, 395, 398; 26/9, 15 R, 16, 69 B; 69/24, 25

[56] References Cited

U.S. PATENT DOCUMENTS 3,916,143 10/1975 Farrell ........................... 219/121 LJ
4,271,568 6/1981 Durville et al. ........................ 26/9

OTHER PUBLICATIONS

L. G. Nivens, *Western Electric Technical Digest,* "Laser Beam Wire Stripping Machine.

*Primary Examiner*—C. L. Albritton
*Attorney, Agent, or Firm*—Henry Sternberg; Bert J. Lewen

[57] ABSTRACT

A method of severing fibre from a fell comprises moving a fell in a longitudinal direction and traversing the fell with a laser beam focused onto the fibre adjacent the skin of the fell.

15 Claims, 17 Drawing Figures

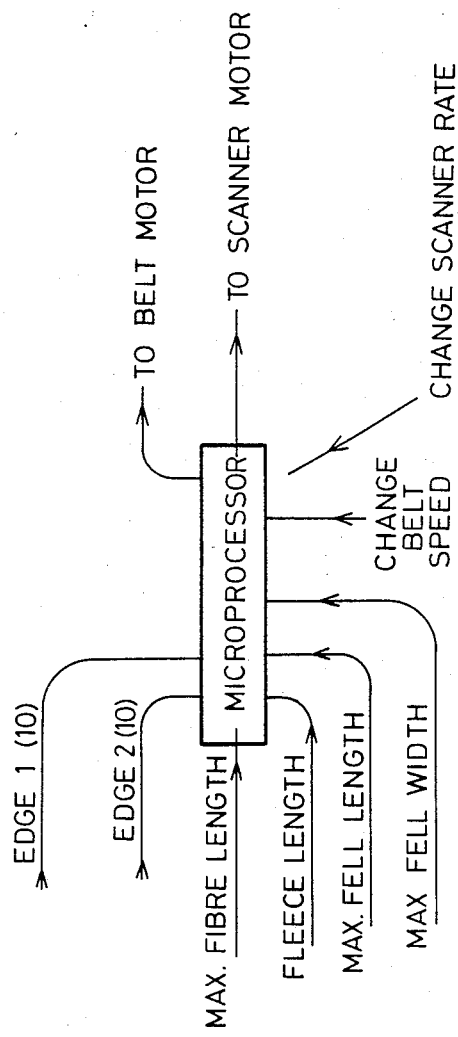

LASER MEANS AND METHOD

This invention relates to a laser means useful for severing in an industrial process, and to a method for such severing. For example, in one aspect of the invention, it relates to the severance of wool from a woolly skin or fell.

BACKGROUND OF THE INVENTION

Mechanical cutters have been used heretofore for a large number of industrial processes, including removal of wool from fells, but a fibre of wool is stiff and strong, and as a result, wool removal with mechanical cutting blades results in a need for frequent sharpening of the blades. Furthermore, there is considerable wastage due to the amount of wool left on a skin.

This difficulty has been recognised, and wool removal is sometimes effected by a chemical process, which is both expensive and unsavoury.

The main object of this invention therefore is to provide a process which can be used for example for removal of wool from fells, but which can also be used in other instances wherein cutting can be effected by heat.

In this invention use is made of a laser for severing fibre from a hide, or wool from a woolly skin (fell).

If a laser beam of 15 mm diameter is focused with a lens or mirror having a focal length of about 200 mm, its effective focal depth will be about 7 mm, and if the laser energy is used to sever wool from a fell by traversing the laser scans across the fell as the fell moves forwardly, a depth of cut (focus) of 7 mm will be achieved in each swath. Thus if a fell 1 meter in length, requires to be cut in 15 seconds, the rate of cutting will be 10 swaths or scans per second. If the traverse is 1 meter, this is at least inconvenient to achieve mechanically.

BRIEF SUMMARY OF THE INVENTION

In this invention a method of severing fibre from a fell comprises moving a fell in a longitudinal direction and traversing the fell with a laser beam focused onto the fibre adjacent the skin of the fell.

A particularly useful laser for this purpose is a carbon dioxide laser which is more efficient than some other lasers (about 15 percent), and oscillates in the infra-red range of the electromagnetic spectrum at a wave-length of 10 micrometers. However glass is opaque to this very long wave-length, and substances which are transparent thereto are expensive, and in one embodiment of this invention use is made of mirrors to effect the scans of the laser beam. This also enables focusing of an otherwise parallel beam, without lenses and avoids the need to move heavy masses at high mechanical speeds.

Thus in an embodiment of the invention means for severing fibre from a fell comprise conveyor means arranged to convey a fell in a longitudinal direction, a laser, a mirror focusing means so located with respect to the conveyor means and laser as to focus a laser beam when issuing from the laser and direct the focused laser beam in a plane substantially parallel to the skin, and scanning means associated with the laser and its focusing means and operable to scan the focused beam in a traversing movement in the plan.

Several embodiments of the invention are described hereunder in some detail with reference to and are illustrated in the accompanying drawings, in which—

Figure 2:
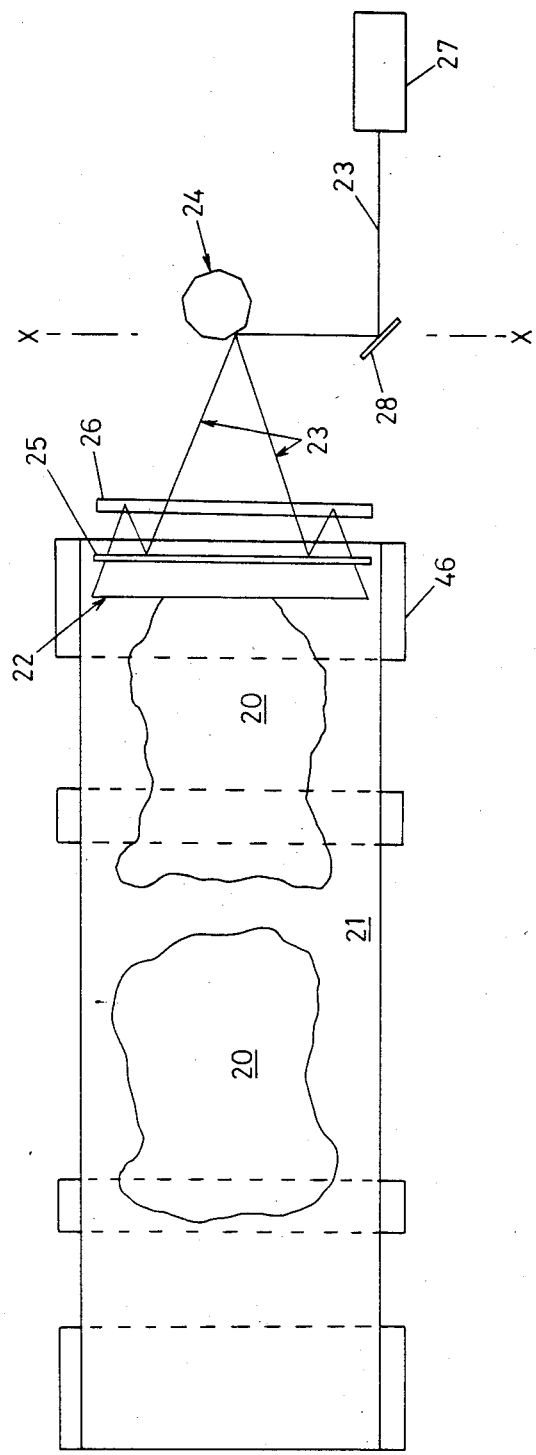
Figure 3:
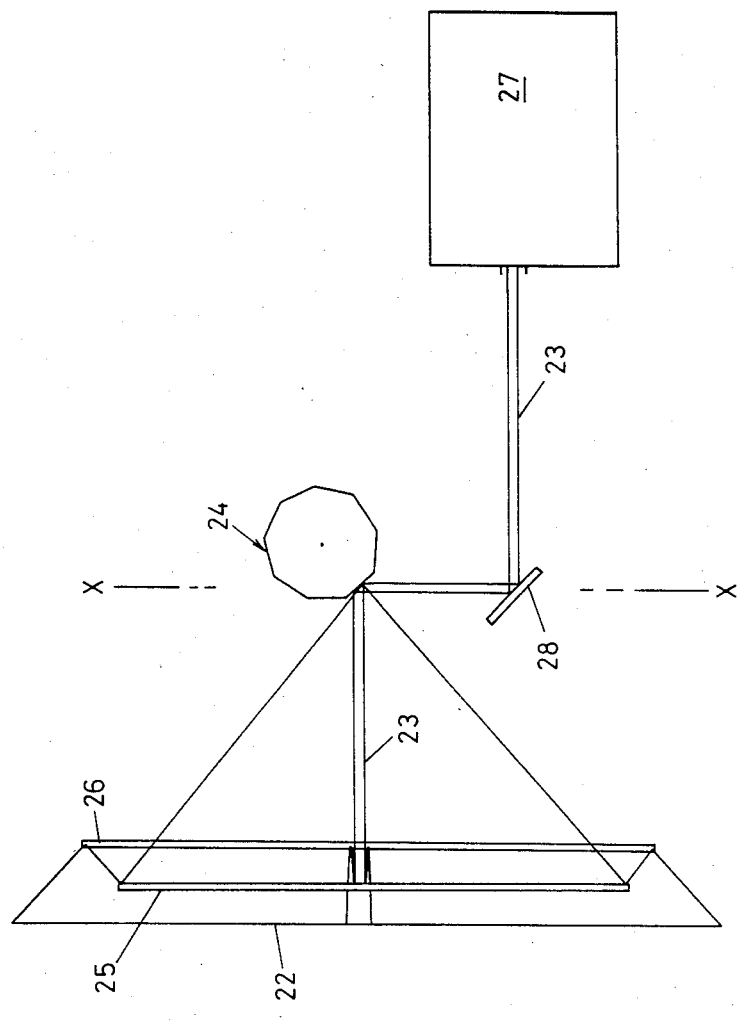
Figure 4:
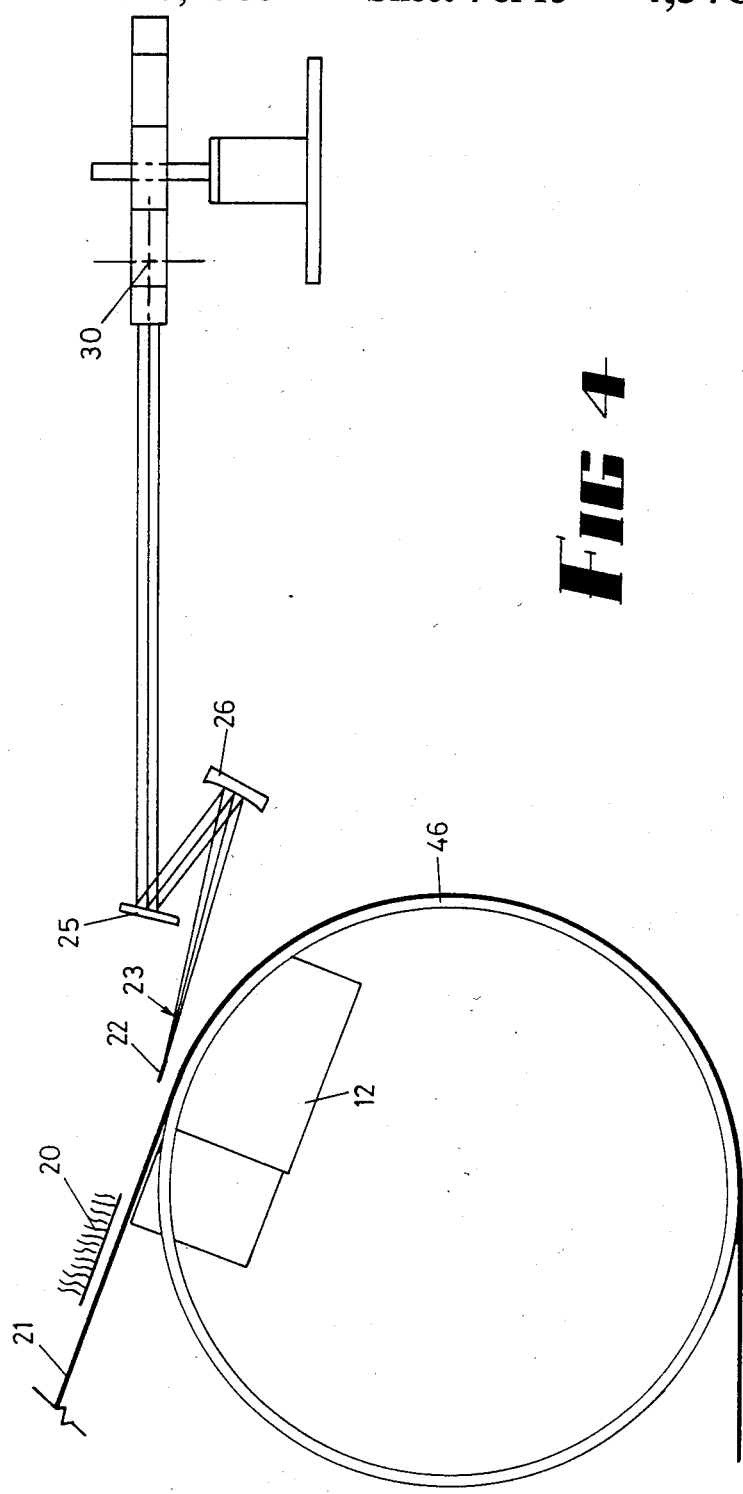
Figure 5:
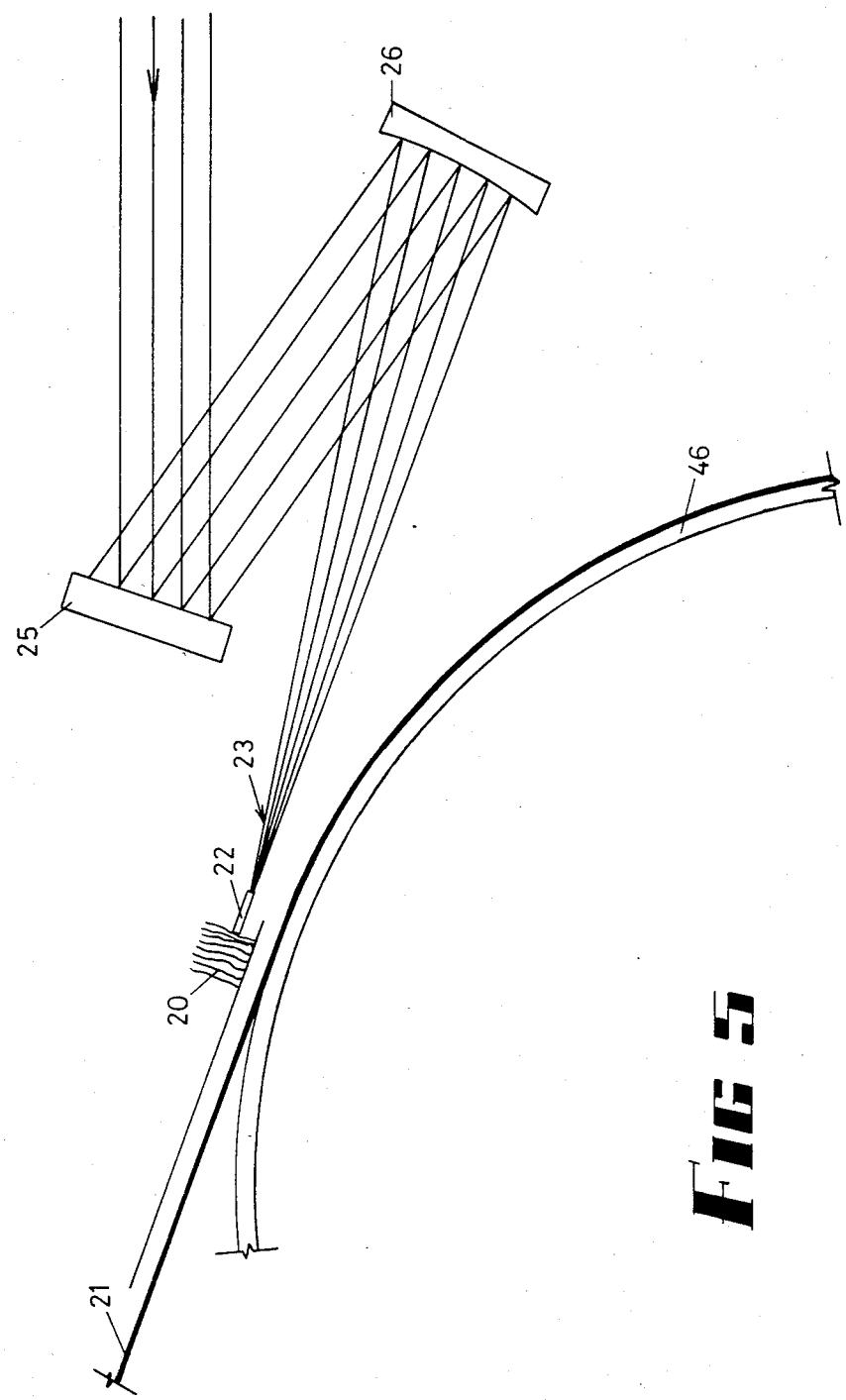

FIG. 1 is a diagrammatic side view of a complete machine according to a first embodiment, comprising a conveyor system to move the fell to the laser cutting line where the focused beam severs the wool from the fell, FIG. 2 is a plan view of the machine of FIG. 1, showing the laser beam directed onto a polygonal rotating reflector and thence to two long mirrors which focus the beam down to a fraction of a millimeter in the vertical plane so as to cut the wool from the fell, FIG. 3 shows the scanner arrangement in more detail. A nine sided polygon is used which scans the beam through 80°. The long mirrors focus the beam linearly across the fell, FIG. 4 is an elevation through the longitudinal central plane of the machine and shows a suction drum to hold the fell to the conveyor and the focusing arrangement, FIG. 5 shows a further enlargement of the path of the laser beam and the details of the focusing mirror. In this case the first mirror is a plane reflector and the second a curved mirror to focus the beam.

Figure 6:
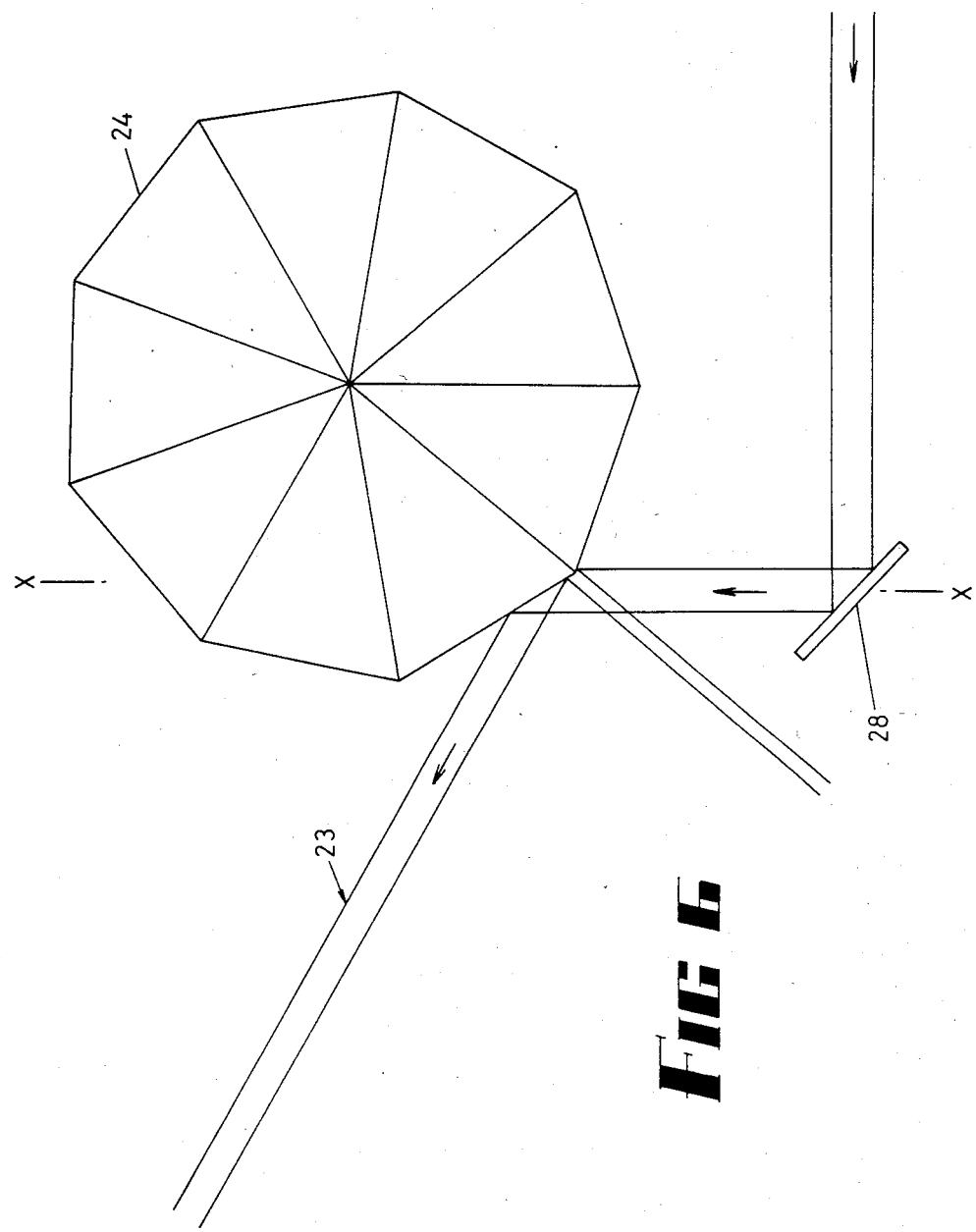
Figure 7:
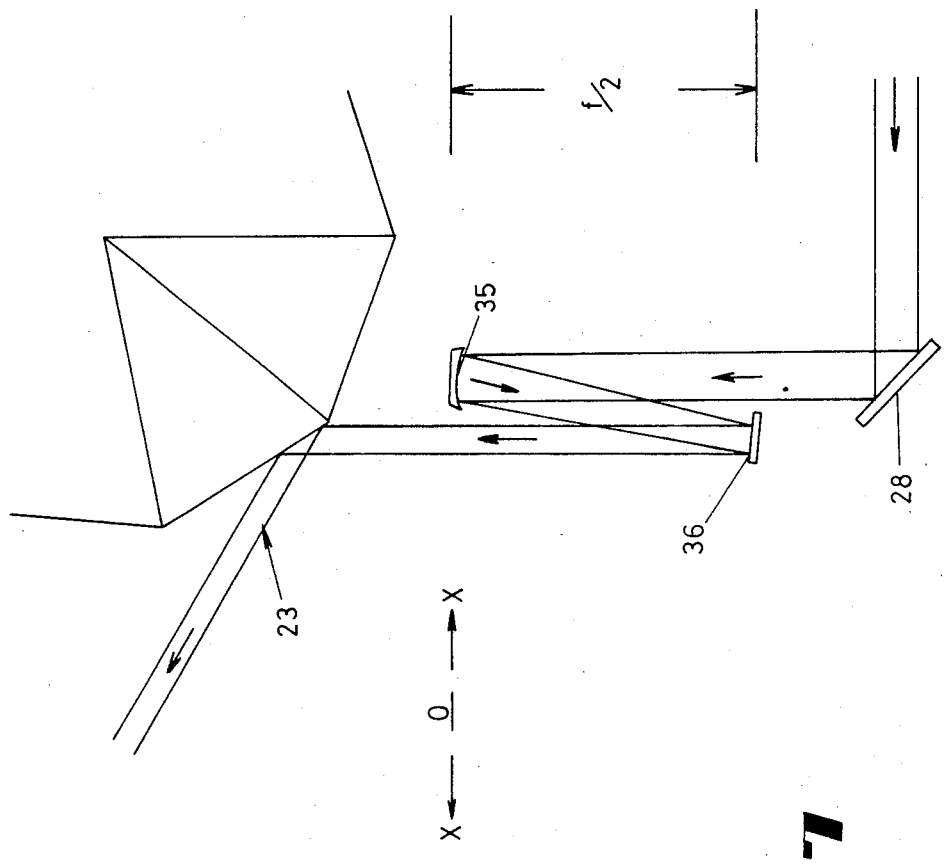
Figure 8:
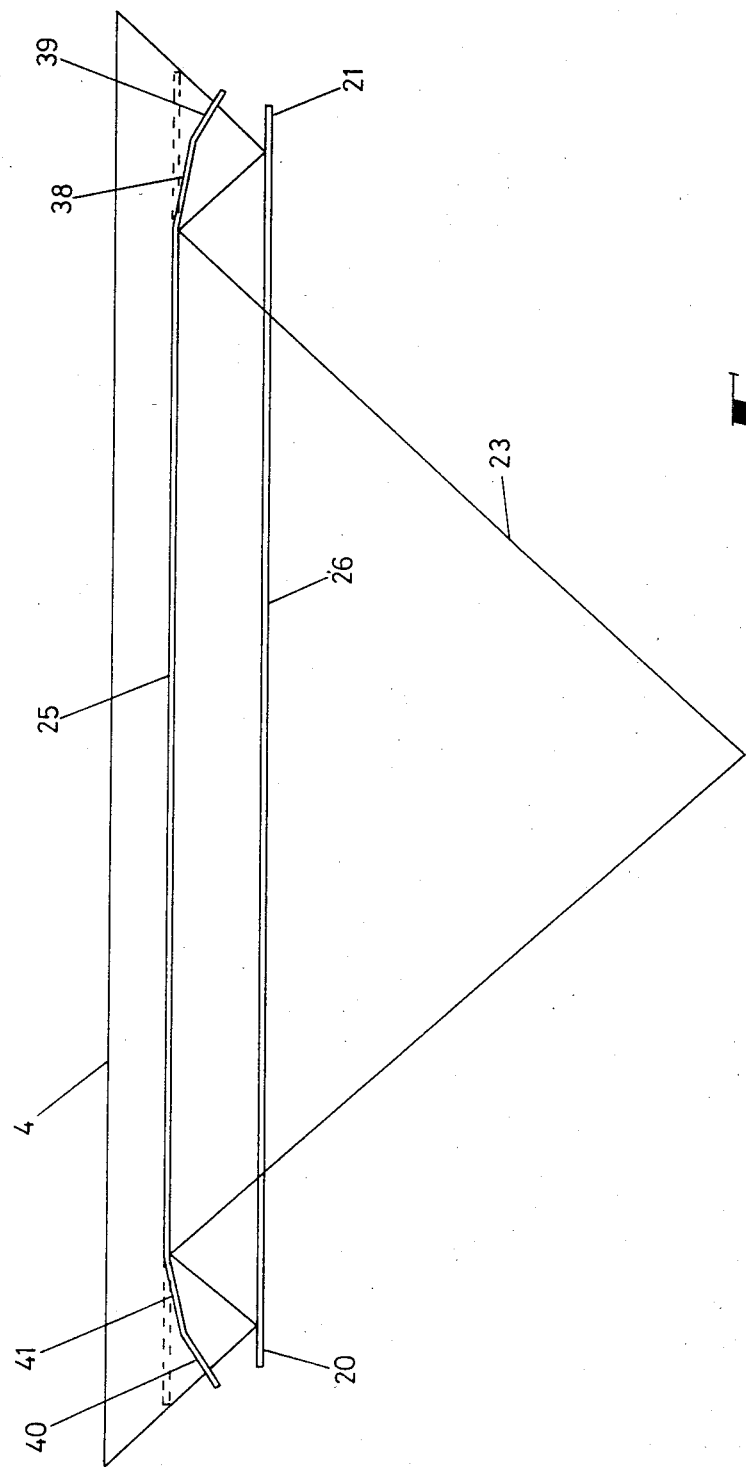
Figure 9:
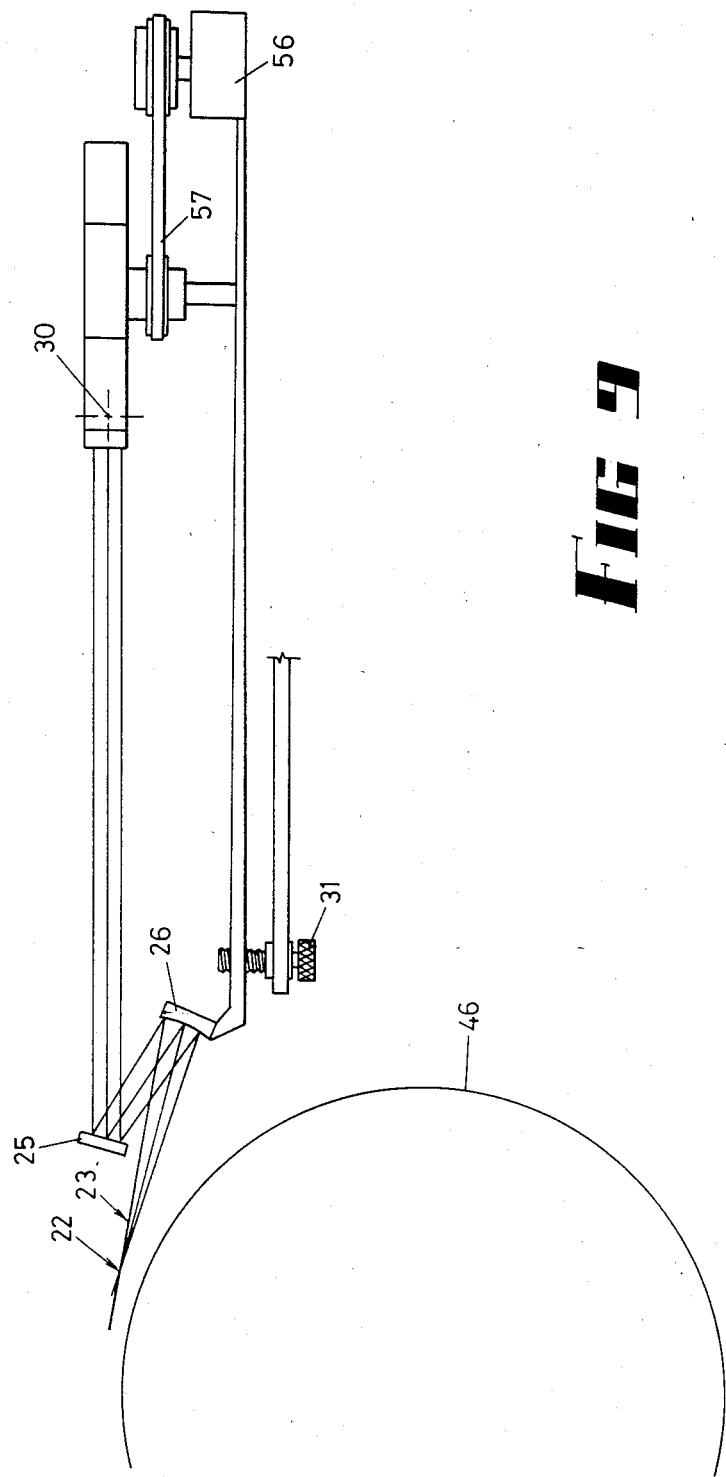
Figure 10:
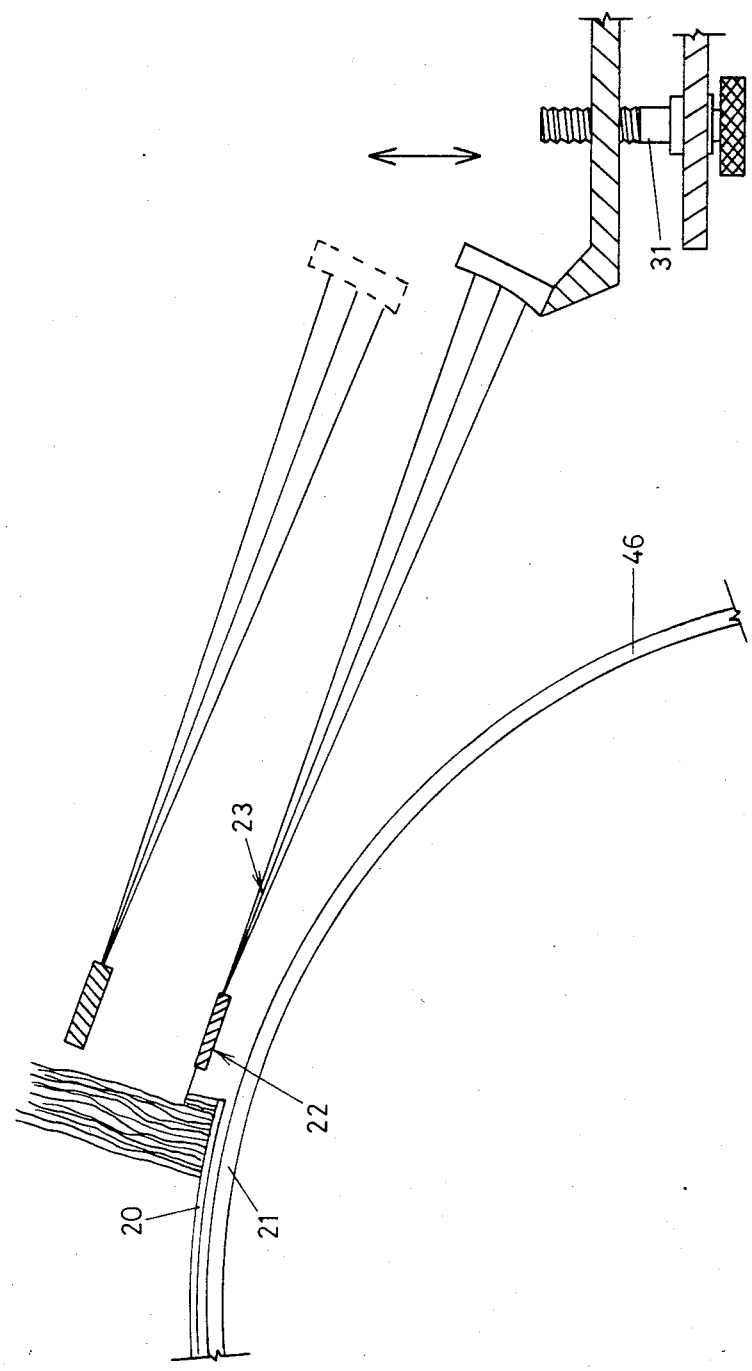
Figure 11:
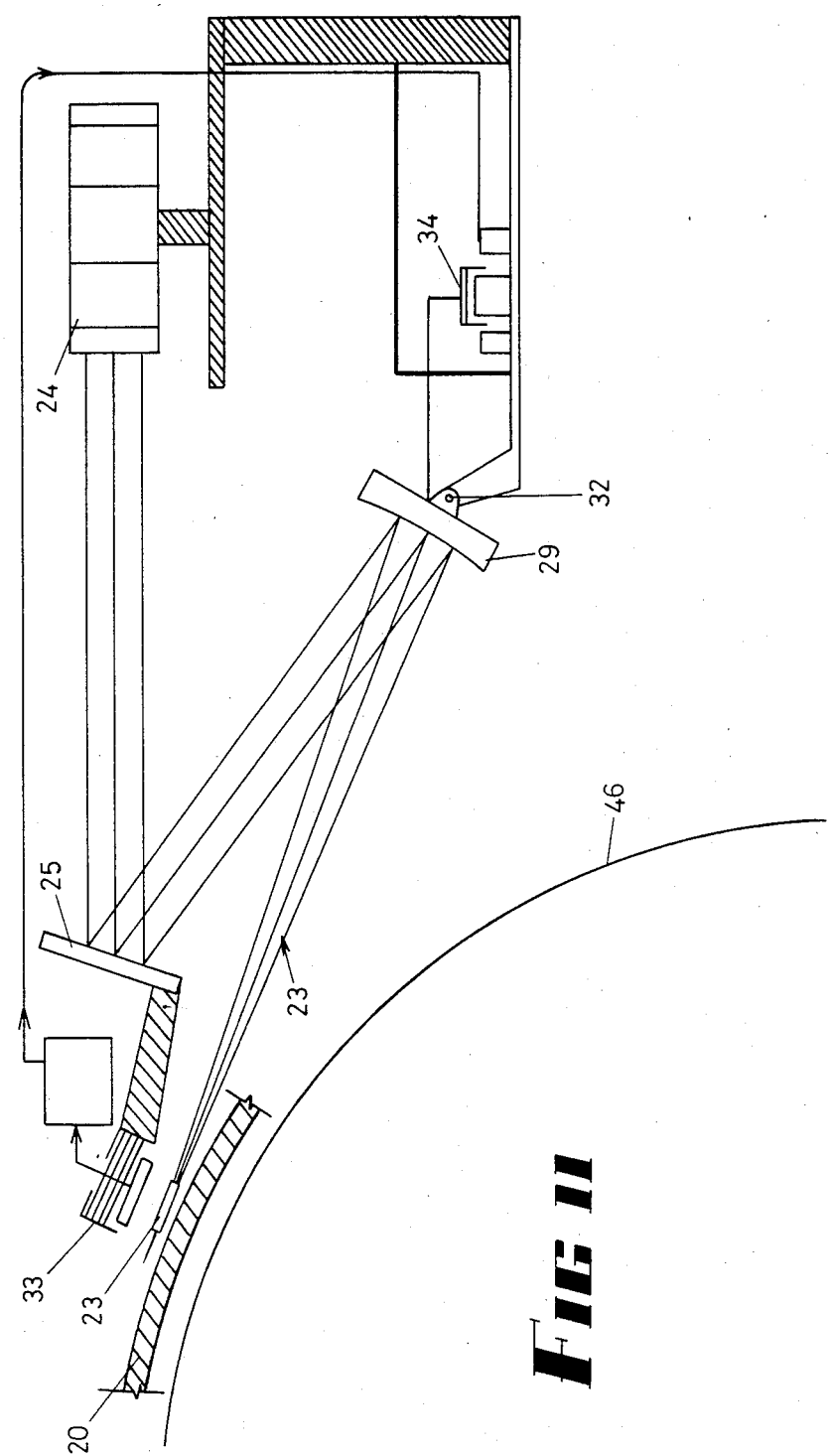
Figure 12:
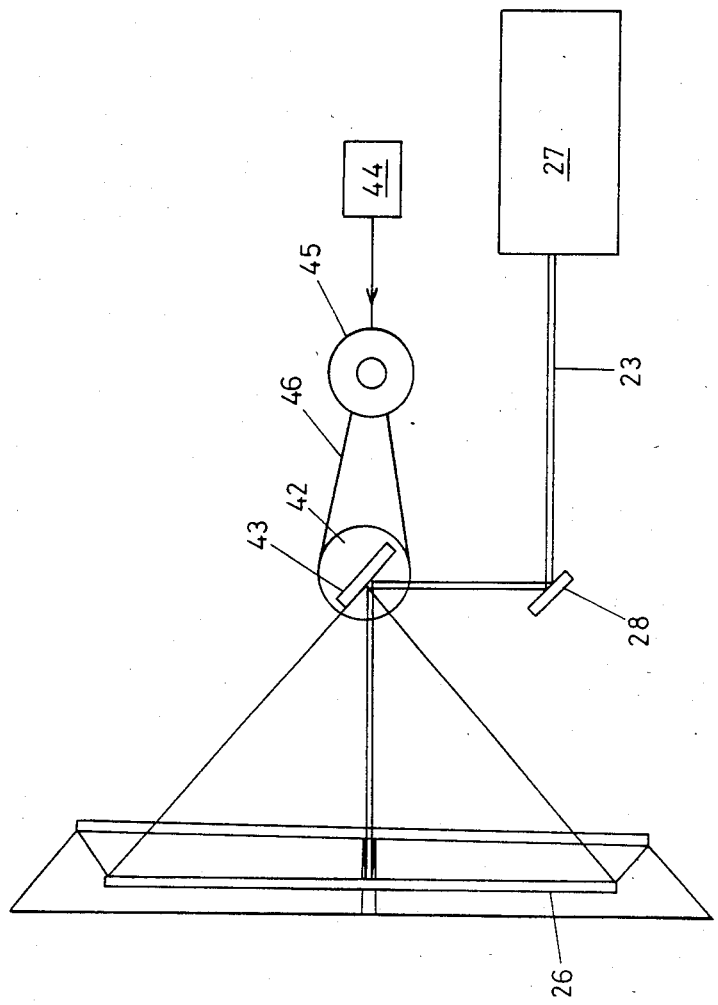

FIG. 6 is a plan showing the nonagon scanning wheel in more detail, in an arrangement wherein the laser beam is reflected through 90° along the direction X—X. The focusing head to the left of this line is constructed so that it can be rotated about the X—X axis, say 1°, so as to provide a means of adjusting the height of the cut above the fell, FIG. 7 shows a means of reducing the "corner effect" which is the gradual transition of the laser beam from one side to the next. This transition is lessened by contracting the beam in the horizontal plane (x direction), FIG. 8 shows another method of achieving the same object by introducing outrigger mirrors at the ends of the scan, FIG. 9 is a diagrammatic elevation, showing the scanning wheel of FIG. 6, and also illustrating how the height of the focus above the skin may be varied and set by tilting the scanner and focusing assembly, FIG. 10 is a diagrammatic elevation which shows means for and effect of tilting the beam, FIG. 11 is a diagrammatic elevation which shows means for automatically raising and lowering the beam a few mm as the beam traverses across the fell. (This provides a means of following the contour of the skin to take care of variations in the thickness of the skin), FIG. 12 shows a second embodiment wherein the polygonal mirror is replaced by a single plane mirror which oscillates through an angle of up to 40° and scans the beam across the fell.

Figure 13:
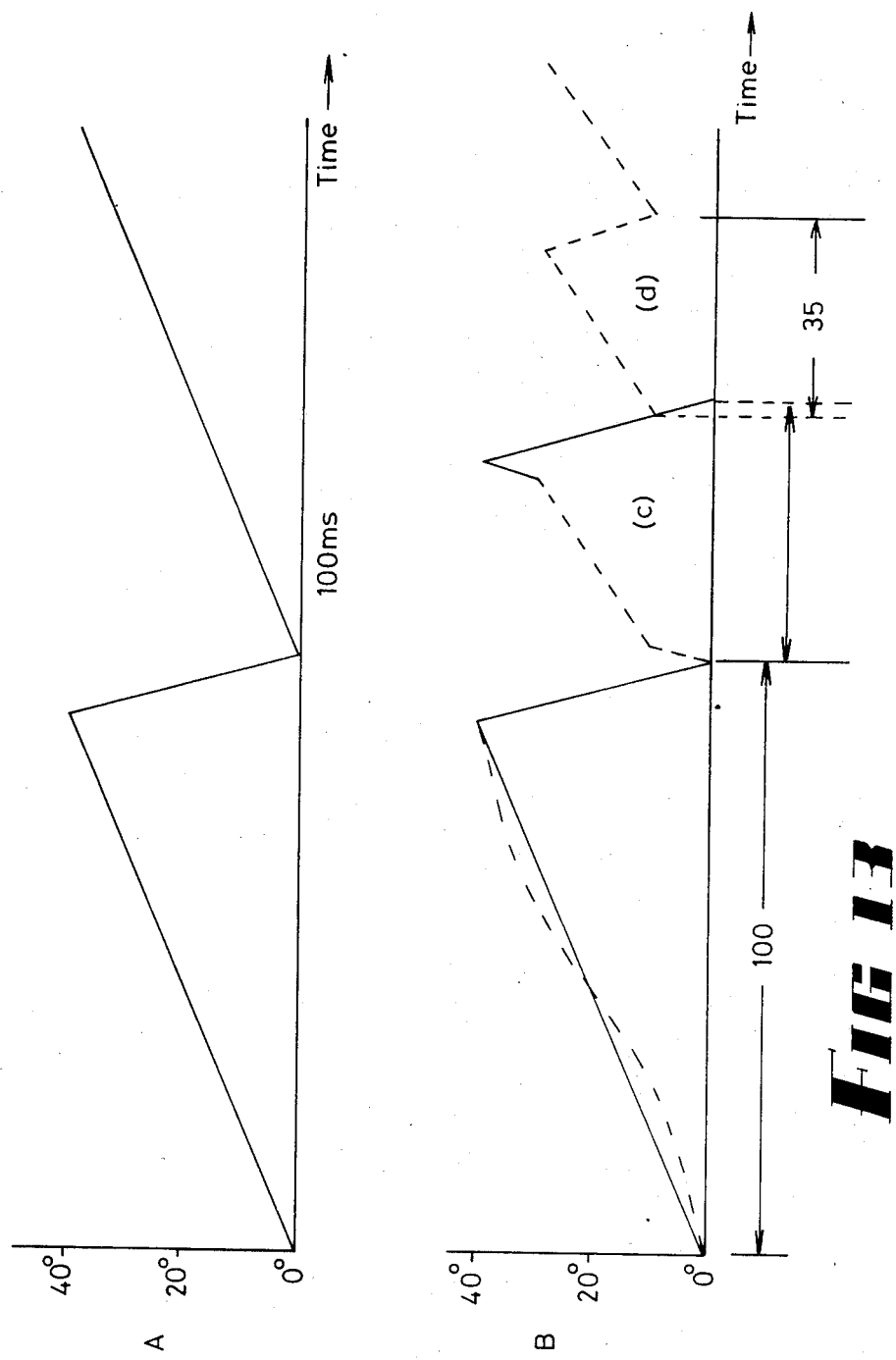

FIG. 13 shows graphically the duty cycle, specifically illustrating how the duty cycle is reduced as the width of the skin varies, thus reducing the time taken to remove the wool, FIGS. 14A, B and C illustrate the suction drum by means of which the fell is sucked down against the mesh conveyor belt and the perforated hollow drum whilst the cut wool is sucked upwards and away to the wool storage, and FIG. 15 illustrates in block diagram form control of the scanner motor and the belt speed.

In both embodiments the laser used is a carbon dioxide laser and this has the property of severing wool or other fibre from its relevant hide.

Unlike most other lasers it is efficient and 15 percent of the electrical energy fed into it can be converted into radiation. In some respects it is like a very fine blow torch but unlike this it does not heat the air as it passes through it. However an absorbent object such as wool will be vaporised when it is placed in the path of the beam. For cutting wool the power density in the beam must be greater than about 1 watt per sq mm (when the beam is stationary or moving slowly through the fleece).

To be economically viable, a laser machine should be able to process about 200 skins per hour and thereby the wool should be removed from a fell in about 15 seconds. A large fell measures about 1 m by 1 m and from experiments, it is estimated that a 250 watt laser will be required to remove the wool from this area in 15 seconds.

The beam when it emerges from the laser is a parallel beam of 15 mm diameter and thus has a power density within the beam of about 1 watt per sq mm. To cut wool cleanly this is focused down into the fine line focus by concentrating the radiation into the horizontal plane by means of a cylindrical lens or mirror. A limit is imposed on the fineness by diffraction to a thickness "d" given by the formula $$d = \frac{1.2 f \lambda}{D} \quad (1)$$

where
d is the thickness of the line focus (kerf width)
$\lambda$ is the wave-length—10.6 micrometers
D is the diameter of the laser beam
f is the focal length of the mirror or lens If, for example, the focal length is 200 mm and the beam diameter 15 mm then the thickness of focus d is 0.16 mm. Thus in a properly constructed machine the length of fibre lost in the cutting process will be only 0.16 mm which is negligible.

In each machine described herein the wool is cut by sweeping the focus across the skin and so removing the swath on each pass which is of a width equal to the depth of focus. This will be designated by dz and is derived from the formula $$dz = \frac{4 f^2 \lambda}{D^2} \quad (2)$$

Again using a focal length of 200 mm, the depth of focus will be 10 mm. If the skin has to be cut in 15 seconds then the rate of cutting will be 10 swaths or scans per second.

The choice of focal length has a profound effect on the design of the machine. The focus has three dimensions which will be designated respectively by dx, dy and dz. It is not necessary to focus the beam in the horizontal plane and so the dimension dx will be unchanging at 15 mm. A range of focal lengths from 100 mm to 300 mm will be considered and its effect on the dimension dy and the focal depth dz are tabulated below in Table 1. Also in the fourth column the power density in the focus is calculated by dividing the power of 250 watts by the cross sectional area of the focus which is dx times dy

TABLE 1

| Focal length mm | dy mm | dz mm | p.d. (power density) watts/mm² |
| --- | --- | --- | --- |
| 100 | 0.08 | 1.8 | 200 |
| 200 | 0.16 | 7.1 | 100 |

TABLE 1-continued

| Focal length mm | dy mm | dz mm | p.d. (power density) watts/mm² |
| --- | --- | --- | --- |
| 300 | 0.24 | 16.0 | 70 |

To cut wool from a skin in 15 seconds requires that the conveyor belt must travel at 67 mm per second. If the focal length is 200 mm the depth of focus will be 7 mm and the rate of scanning 10 per second. With a focal length of 100 mm the scan rate must be increased fourfold to 40 per second. Difficulties arise if the focal length is much greater than 200 mm because of the mechanical tolerances required in positioning of the focusing elements. Experimentally, focal lengths of from 40 to 160 mm have been used and cutting is satisfactory in both cases.

Glass is opaque at a wavelength of 10 microns and so cannot be used as a lens material. The choice of material for lenses is very limited and at high power densities transparent materials such as germanium can be damaged. Mirrors can be made of polished metals such as brass, tungsten and molybdenum. Whilst these metals are difficult to machine they have been widely used. The tolerance required at this wave-length is 20 times less than for optical components used for visual wavelengths. The loss on reflection is 4 percent for molybdenum and 1 percent for gold.

The fells 20 are fed by a mesh conveyor belt 21 to the cutting line 22 along which the focus of the laser beam 23 is scanned by a nine sided rotating scanner 24. It is scanned across a pair of fixed mirrors 25 and 26 (see FIG. 3). Laser 27 is fixed, and in FIGS., 1, 2, 3, 6 and 7, reflector 28 reflects laser beam 23 through 90° onto scanner 24. A longitudinal cross-section of the assembly of mirrors 25 and 26 is shown in FIGS. 4 and 5. Mirror 25 is a plane reflector. Mirror 26 is the main focusing mirror which, ideally, should be of parabolic cross-sectional shape. However a close approximation is provided by a circular, part cylindrical shape which is easier and cheaper to make. The angle of incidence at the curved mirror must be small (not more than about 10°) to avoid excessive aberration.

It is usually desirable to cut the wool close to the skin but sometimes it is required to leave 10 to 15 mm of wool on the skin. An adjustment for the height of the cutting line is therefore provided. The whole scanner assembly is pivoted about the axis X—X shown in FIG. 3. This axis is coincident, or nearly so, with the axis of the laser beam as it is directed to the rotary scanner 24. This axis X—X is the axis of a tilting shaft 30 illustrated in FIG. 4, where it is normal to the paper.

In the embodiment described, a movement of 1.5° will change the height 15 mm. This small change in angle can be provided by hinging movement of tilting shaft 30 for simplicity. A simple adjusting screw arrangement for varying the height is shown at 31 in FIG. 9 and in FIG. 10.

Skins sometimes vary in thickness owing to patches of fat adhering to the back and the focus can be made to rise over these high spots by a method utilising the means shown in FIG. 11. The focusing mirror is divided into a number of segments, say twenty, each 40 mm wide and independently mounted on a long transverse pivot axle 32. The focusing elements 25, 26 can be rotated as a sub-assembly about axle 32 through a small angle of say 1° to raise the focus about 3 mm upwards.

A loudspeaker element 34 (moving coil element) can be used for this purpose, controlled by a sensor 33. This sensor can be one plate of a small condensor forming a "capacitor", the other plate of which is the top surface of the skin. As the distance between the two electrodes decreases, the capacity increases slightly and is detected in a circuit housed behind the capacitor. The signal produced is transferred to an actuator 34 which causes the focusing mirror element 26 to rotate through a small angle about pivot axle 32. Thus the beam is raised above the thickened part of the skin.

The polygonal rotary scanner 24 is simple and easy to manufacture. However it has some disadvantages. Firstly, there is the "corner effect". The transition from one side to the next is not clean cut and so the power in the beam is reduced at each end of the scan.

This can be reduced to some extent by compressing the beam in the x direction as shown in FIG. 7. A concave mirror 35 converges the beam in the x direction and is then expanded by mirror 36 to produce a parallel beam, of reduced diameter.

The effect can also be reduced by using outrigger reflectors 38, 39, 40 and 41 at the ends of the flat mirror. (A single mirror at each end can achieve some effect). These return the spilled radiation back into the useful area as shown in FIG. 8.

The "corner effect" can be avoided by using an oscillating mirror of the second embodiment described hereunder with reference to and illustrated in FIG. 12 of the drawings.

The plane reflector 43 could, for example, be oscillated through a scan angle of 40° to move the beam through 80° and so scan as does the nonagonal reflector. This can be done with a cam action. However with this type of scanner it is possible to vary the amplitude of scan in sympathy with the width of the fell. Some skins, for example from lambs, are only half the size of those from large mature animals. The development of high speed stepping motors and servo controlled motors in conjunction with encoder discs makes it possible to control the speed and amplitude of the movement of the mirror.

In FIG. 12 the scanning mirror 42 is oscillated by a servo motor or stepping motor 44 which drives the encoder disc 45 and the scanner by a reduction gear or belt 46. The beam rapidly "flies back" and repeats the scan. The mirror, in being driven by a stepping motor 44, can have the amplitude and rate of scan controlled so as to scan and cut only the actual width of the skin.

FIG. 13 shows how the cycle time can be reduced by a factor of 2 or 3 times by restricting the amplitude according to the width of the fell.

Figures 14, 14B, 14C:
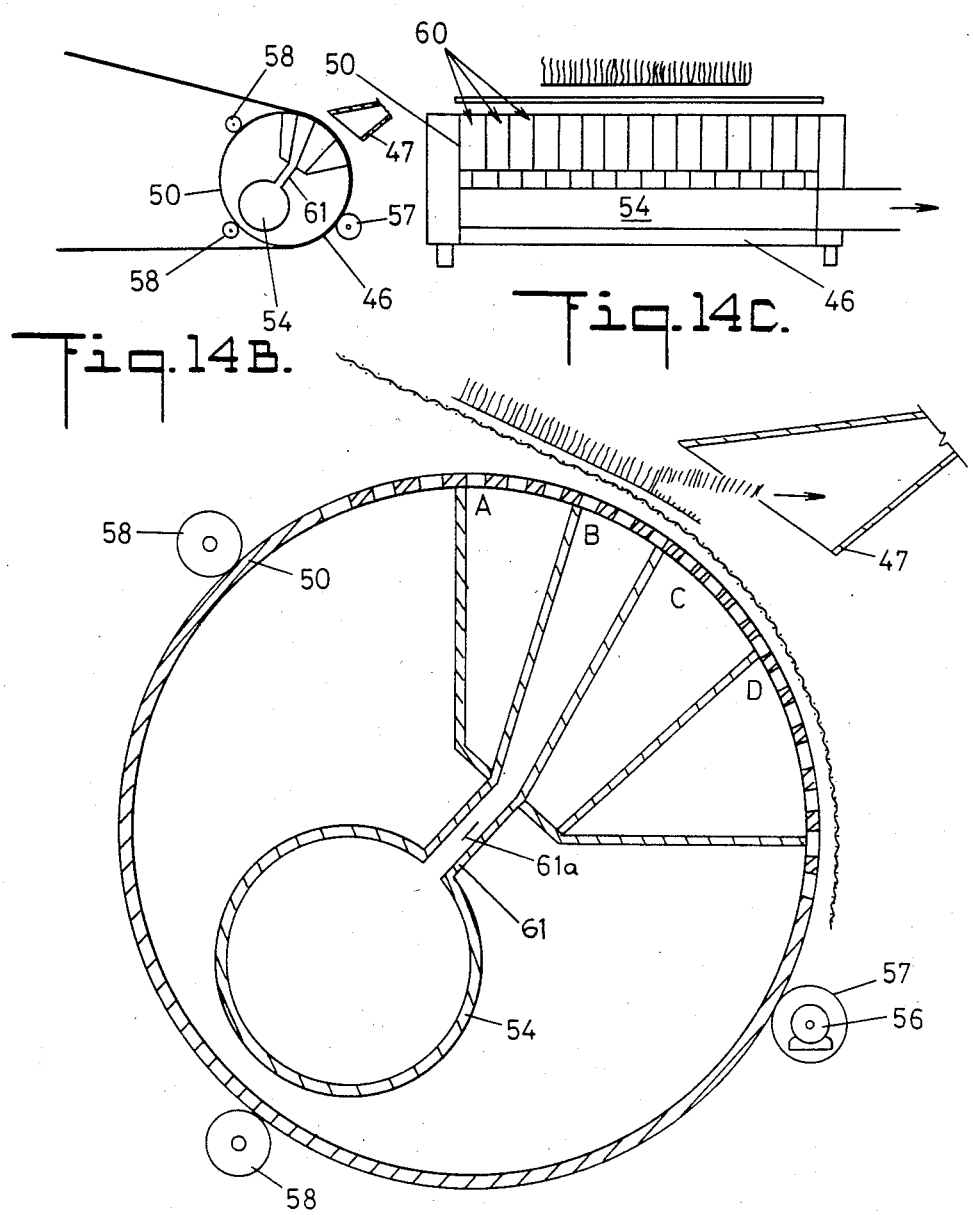

FIGS. 14A, 14B, and 14C show how the positions of the edges of the fell 20 across the suction drum 50 are ascertained.

Air is drawn out through vacuum tube 54 and the suction is divided equally between about 20 sections along the width of the drum. The airflow in each section is measured by a thermistor and the variation of flow is used to delineate and measure roughly the position of each edge of the fell. This information is then used to control the speed and amplitude of the scan. The drum 50 is hollow and its curved walls are perforate. It is driven by a small external drive motor 56 with a drive wheel 57, two pairs of idler wheels 58 to restrain it. Suction is applied through the vacuum tube 54 to about twenty segments 60 along the drum 50. They cover the arc ABCD of the drum but the main suction is applied over arc BC which lies below the cutting line.

Each segment is supplied with vacuum through a restricted orifice of a respective small pneumatic transfer conduit 61 and inserted in this is a thermistor bead (61a). This is used to measure the rate of airflow. The airflow rate is reduced when the skin covers the entrance arc BC and this change is used to ascertain, approximately, the locations of the edges of the skin. These signals are fed into a microprocessor shown in FIG. 15 where they are processed to make the scanner motor rotate the scanner mirror appropriately.

If the laser beam is rotated uniformly through 80° it will move faster by about 30 percent, at the beginning and end of the scan. This is a "secant effect". The cutting power will therefore vary along the cutting line. This can be compensated for by suitably programming the micro-processor. This is illustrated in FIG. 13 by the broken curve (B). The rate of angular rotation is reduced in the centre of the scan by approximately 30 percent.

The fly back time is illustrated as 10 percent of the cycle and this of course is wasted time and so should be as short as practicable.

When the skin width is only one-third of the maximum, the cycle time can be reduced to 44 percent in FIG. 13C, or 35 percent in FIG. 13D which shows the scanning mirror being reversed as soon as the required amplitude has been obtained.

This shows the great advantage of the oscillating mirror when the width of the workpiece is widely variable as with sheep skins.

I claim:
1. Means for severing fibre from the skin of a fell, comprising:
   a conveyor means arranged to convey the fell in a longitudinal direction,
   a laser,
   focusing means spaced from the laser and so arranged with respect to the laser and the conveyor means as to focus the laser beam on to the fibre adjacent the skin when the fell is on the conveyor means, and
   scanning means associated with the laser and its focusing means and operable to scan the focused laser beam in a traversing movement along a cutting line.
2. Means according to claim 1 wherein said focusing means comprises at least one curved mirror.
3. Means according to claim 1 or claim 2 wherein said scanning means comprises a rotary mirror, and a motor coupled for drive to the rotary mirror.
4. Means for severing wool from the skin of a fell, comprising:
   a conveyor arranged to convey the fell in a longitudinal direction, drive means coupled for drive to said conveyor,
   a laser,
   a multi-sided mirror in the path of a laser beam when issuing from the laser, and a motor coupled to the mirror for rotating the mirror, and
   at least one curved focusing mirror in the path of the beam when reflected by said multi-sided mirror, so arranged with respect to the multi-sided mirror and conveyor as to scan the wool of a fell adjacent the skin thereof with a focus of the laser beam in a traversing movement while the conveyor conveys the fell towards the focusing mirror.

5. Means according to claim 4 comprising adjustment means coupled to the focusing mirror and operable to adjust the distance of the focus from the conveyor.

6. Means according to claim 5 wherein said focusing mirror forms part of an assembly, and said adjustment means comprises tilt adjust means operable to adjust angle of tilt of the focusing mirror assembly with respect to the conveyor.

7. Means according to claim 1 wherein said scanning means comprises a mirror, mounting means mounting the mirror for oscillating movement, and drive means coupled to the shaft for effecting said oscillating movement.

8. Means according to claim 1 wherein said conveyor means comprises a perforated conveyor belt carried by a perforated suction drum located beneath the cutting line, and further comprising suction means coupled to the suction drum and arranged to retain the skin in contact with the conveyor belt as it traverses said drum.

9. Means according to claim 8 further comprising a plurality of pneumatic transfer conduits located within the drum, and respective airflow sensors in said conduits, each airflow sensor being responsive to airflow through its respective said conduit and arranged to thereby sense the width of a fell beneath said cutting line, and a microprocessor operatively coupled between said sensors and said scanning means for control of the scanner movement, and thereby length of the cutting line.

10. Means according to claim 1, wherein said scanning means comprises a mirror, a mounting shaft mounting the mirror for oscillating movement, and drive means coupled to the shaft for effecting said oscillating movement, and wherein said conveyor means comprises a perforate conveyor belt carried by a perforate suction drum located beneath the cutting line, and further comprising suction means coupled to the suction drum and arranged to retain the skin in contact with the conveyor belt as it traverses said drum, further comprising airflow sensors located within said drum, and a micro-processor operatively coupled between said airflow sensors and said rotary mirror drive motor for control of said motor as a function of the width of said skin.

11. Means according to claim 4, wherein said scanning means comprises a mirror, a mounting shaft mounting the mirror for rotary movement, and drive means coupled to the shaft for effecting said rotary movement, and wherein said conveyor means comprises a perforate conveyor belt carried by a perforate suction drum located beneath the cutting line, and further comprising suction means coupled to the suction drum and arranged to retain the skin in contact with the conveyor belt as it traverses said drum, further comprising airflow sensors located within said drum, and a micro-processor operatively coupled between said airflow sensors and said conveyor drive means for control of the speed of said conveyor as a function of the width of said skin.

12. A method of severing fibre from the skin of a fell comprising moving the fell on a conveyor in a longitudinal direction, and scanning the fibre adjacent the skin with a focused laser beam in a traversing movement.

13. A method according to claim 12 further comprising intercepting said laser beam by a multi-sided mirror and reflected thereby onto a curved focusing mirror to thereby focus the laser beam, and rotationally driving said multi-sided mirror to effect said scanning.

14. A method according to claim 12 wherein the distance of the focus of said beam from a surface of said conveyor is adjusted by adjusting the position of said curved focusing mirror.

15. A method according to claim 12 further comprising intercepting said laser beam of a mirror having a plane surface and mounted for oscillating movement, and oscillating said mirror to reflect the laser beam onto a curved focusing mirror to thereby focus the laser beam.

* * * * *